Dec. 29, 1931.  S. BARBARINO  1,839,189
VEHICLE
Filed Sept. 15, 1926   2 Sheets-Sheet 2
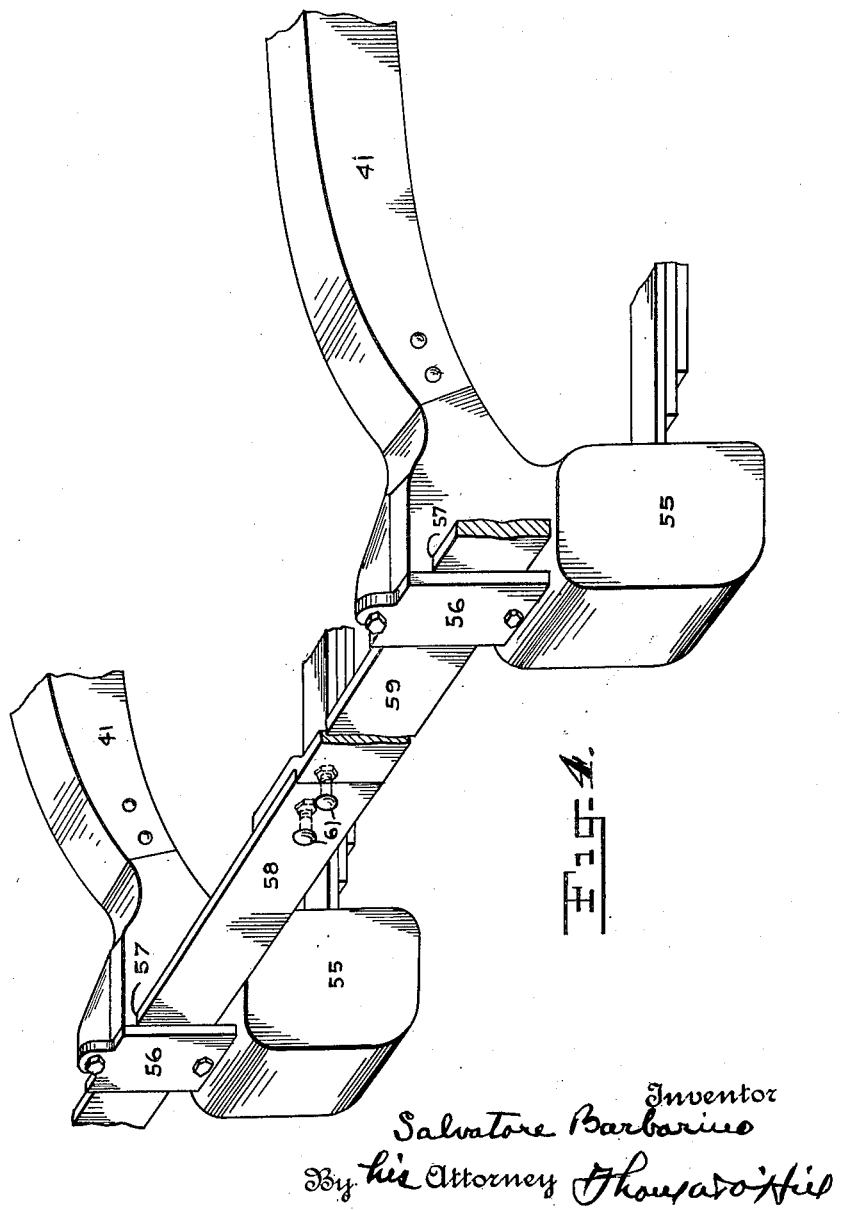

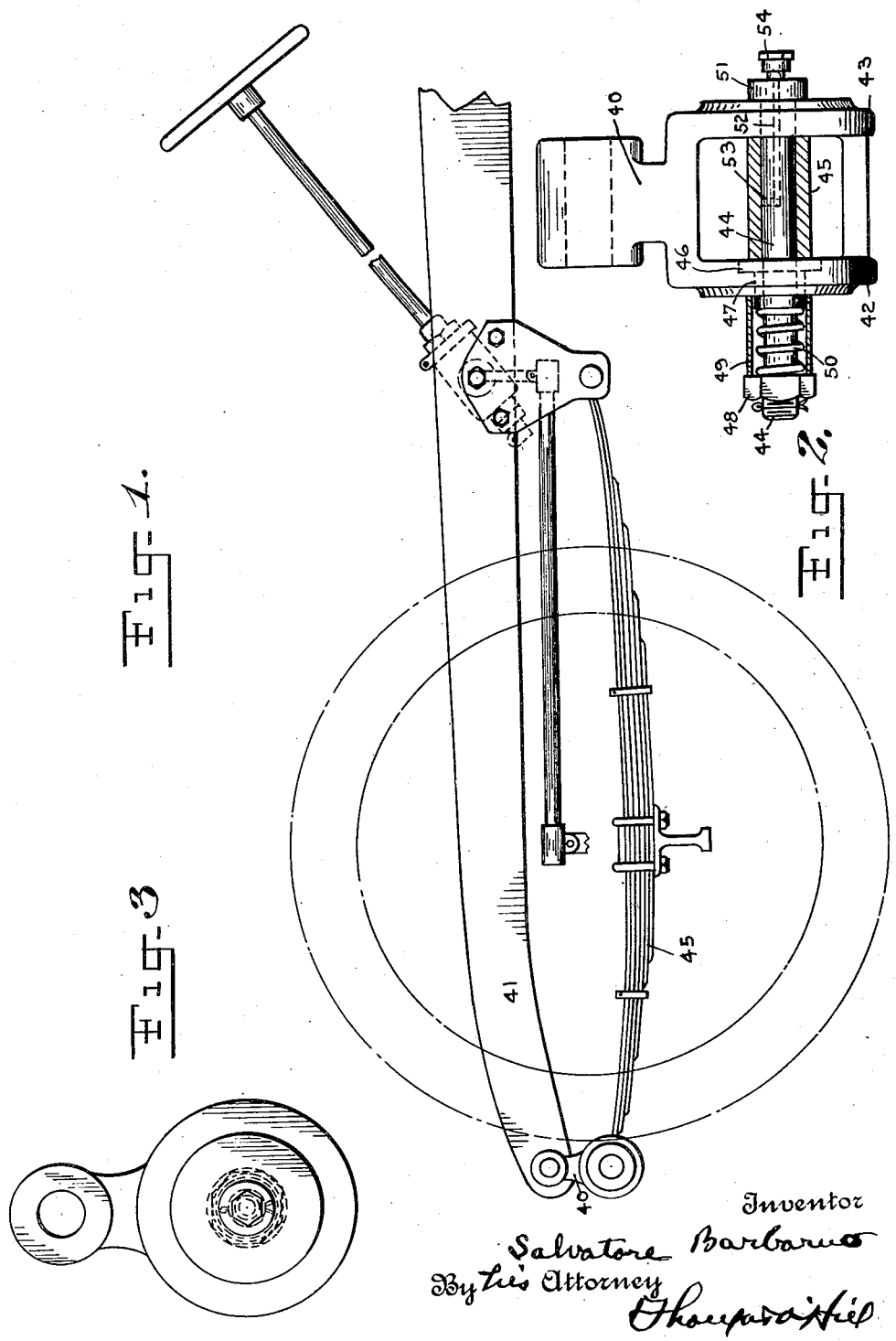

Patented Dec. 29, 1931

1,839,189

UNITED STATES PATENT OFFICE

SALVATORE BARBARINO, OF BROOKLYN, NEW YORK

VEHICLE

Application filed September 15, 1926. Serial No. 135,557.

My invention relates to improvements in automobiles and more particularly has reference to means in combination therewith for preventing so-called "shimmy" or "whip" of the spring ends.

In the accompanying drawings, I have illustrated in Fig. 1 in side elevation, parts being broken away, the front of one side of an automobile chassis, showing an application of the means for preventing vibration of the spring tips at the shackle, Fig. 2 is an end view of the spring and shackle connection partly in cross-section and Fig. 3 is a view looking from right to left at Fig. 2. Fig. 4 is a perspective view, parts being broken away illustrating the front portion of the chassis and method of attaching the bumper.

Referring to the drawings, it will be seen that the shackle 40 at the end of the chassis 41 has two (2) depending sides 42, 43 through which the shackle pin 44 projects as shown. 45 indicates the looped end of the spring upon the outside of the shackle pin and between the sides 42, 43 abutting one (1) face of the flanged sleeve 46, the shank 47 of which projects beyond the outside of the shackle as shown. One end of the shackle pin 44 is preferably threaded for the nut 48 and is covered with a sleeve 49 within which is the coiled spring 50 which is compressed as the nut 48 is turned down. The other end of the shackle pin 44 is provided with a boss or flange 51 and said pin is preferably drilled longitudinally as indicated at 52 and laterally as indicated at 53, and is provided at one end with a grease cup 54 so that by turning down upon the latter, the grease therein is forced through the pin and between it and the spring 45 for lubrication purposes. This arrangement of the shackle and spring mounting minimizes the so-called "shimmy" or vibration at the end of the spring 45 due to the fact that the spring 45 is constantly forced rightwardly looking at Fig. 2 by the coiled spring 50 against the side 43 of the shackle with which it is frictionally engaged, thus subduing or minimizing the vibration aforesaid.

Referrng now more particularly to Fig. 4, it will be observed that the chassis 41 is provided at the front ends with a well-known form of shackle housig 55 upon the front of which may be secured plates 56 as shown, said housing at the top and front being cut away as indicated at 57 for the ends 58, 59 of the bumper 60, said ends preferably overlapping at the center as shown and being suitably secured as indicated at 61, thus providing a convenient, accessible, secure arrangement for securing the bumper.

Of course, it will be understood that various modifications may be made in the construction and arrangement of parts without departing from the spirit of the invention as claimed.

I claim:

1. In a vehicle of the class described, a steering wheel and a spring suspension at one side of the front of said vehicle, the back of said spring suspension being pivotally fixed with reference to the frame of said vehicle, and the front of said spring suspension being secured by shackle to the frame of said vehicle, said shackle having resilient means for moving said spring suspension laterally with reference thereto.

2. In a vehicle of the class described, a steering wheel and a spring suspension at the left front of said vehicle, the back of said spring suspension being secured to the frame of said vehicle by a single pivot, the front of said spring suspension being secured to the frame of said vehicle by double pivoted means, and resilient means for moving said spring suspension laterally.

In testimony whereof I hereunto affix my signature.

SALVATORE BARBARINO.